(12) United States Patent
Ines et al.

(10) Patent No.: US 9,504,887 B2
(45) Date of Patent: Nov. 29, 2016

(54) MULTI-MATERIAL IRON TYPE GOLF CLUB HEAD

(71) Applicant: Acushnet Company, Fairhaven, MA (US)

(72) Inventors: Marni Ines, San Marcos, CA (US); Uday V. Deshmukh, Carlsbad, CA (US)

(73) Assignee: Acushnet Company, Fairhaven, MA (US)

( * ) Notice: Subject to any disclaimer, the term of this patent is extended or adjusted under 35 U.S.C. 154(b) by 193 days.

(21) Appl. No.: 14/585,688

(22) Filed: Dec. 30, 2014

(65) Prior Publication Data

US 2015/0111665 A1 Apr. 23, 2015

Related U.S. Application Data

(60) Continuation-in-part of application No. 14/512,270, filed on Oct. 10, 2014, which is a division of application No. 13/894,660, filed on May 15, 2013, now Pat. No. 8,870,683, which is a continuation of application No. 13/043,985, filed on Mar. 9, 2011, now Pat. No. 8,454,453.

(51) Int. Cl.
*A63B 53/04* (2015.01)
*B23K 31/02* (2006.01)
*A63B 53/02* (2015.01)

(52) U.S. Cl.
CPC ............. *A63B 53/047* (2013.01); *A63B 53/02* (2013.01); *A63B 53/0475* (2013.01); *B23K 31/02* (2013.01); *A63B 2053/042* (2013.01); *A63B 2053/0408* (2013.01); *A63B 2053/0412* (2013.01); *A63B 2053/0433* (2013.01); *A63B 2053/0491* (2013.01); *A63B 2209/00* (2013.01); *Y10T 29/49826* (2015.01)

(58) Field of Classification Search
USPC .................................................. 473/324–350
See application file for complete search history.

(56) References Cited

U.S. PATENT DOCUMENTS

| | | | | |
|---|---|---|---|---|
| 2,774,600 | A | * | 12/1956 | Reach ...................... A63B 53/04 473/328 |
| 3,655,188 | A | * | 4/1972 | Solheim ................. A63B 53/04 473/290 |
| 3,825,991 | A | * | 7/1974 | Cornell .................. A63B 53/04 228/164 |
| 4,512,577 | A | * | 4/1985 | Solheim ................. A63B 53/04 473/290 |
| 4,826,172 | A | * | 5/1989 | Antonious ............. A63B 53/04 473/242 |

(Continued)

FOREIGN PATENT DOCUMENTS

| | | |
|---|---|---|
| JP | 60-171055 S | 9/1985 |
| JP | 07255879 A * | 10/1995 |

(Continued)

*Primary Examiner* — Alvin Hunter
(74) *Attorney, Agent, or Firm* — Kevin N. McCoy

(57) ABSTRACT

An iron type golf club head comprising a blade portion located near a terminal end of said iron type golf club head, wherein over 50% of said blade portion is made out of a first material; a hosel portion located near a proximal end of said iron type golf club head, wherein over 50% of said hosel portion is made out of a second material; and a bifurcation plane defined as a plane that is perpendicular to said striking face positioned at a distance of 30 mm heel-ward along an X-axis from a face center of said iron type golf club head, said bifurcation plane separating said blade portion from said hosel portion; wherein said first material has a yield strength greater than about 570 MPa; wherein said second material has a yield strength less than about 570 MPa.

16 Claims, 13 Drawing Sheets

(56) References Cited

U.S. PATENT DOCUMENTS

| | | | | |
|---|---|---|---|---|
| 5,062,638 A * | 11/1991 | Shira | ............... | A63B 53/00 473/350 |
| 5,105,550 A * | 4/1992 | Shenoha | ............... | A63B 60/42 33/1 N |
| 5,295,686 A * | 3/1994 | Lundberg | ............... | A63B 53/00 473/291 |
| 5,395,113 A | 3/1995 | Antonious | | |
| 5,415,410 A | 5/1995 | Aoyama et al. | | |
| 5,416,410 A | 5/1995 | Kastler et al. | | |
| 5,439,223 A * | 8/1995 | Kobayashi | ............... | A63B 53/04 473/334 |
| 5,492,327 A | 2/1996 | Biafore, Jr. | | |
| 5,558,332 A * | 9/1996 | Cook | ............... | A63B 53/0487 473/252 |
| 5,616,088 A * | 4/1997 | Aizawa | ............... | A63B 53/04 473/341 |
| 5,823,887 A * | 10/1998 | Mikame | ............... | A63B 53/04 473/290 |
| 5,833,551 A * | 11/1998 | Vincent | ............... | A63B 53/04 473/349 |
| 6,042,486 A | 3/2000 | Gallagher | | |
| 6,093,112 A * | 7/2000 | Peters | ............... | A63B 53/00 473/291 |
| 6,183,376 B1 * | 2/2001 | Peters | ............... | A63B 53/00 473/291 |
| 6,344,000 B1 * | 2/2002 | Hamada | ............... | A63B 53/04 473/329 |
| 6,358,158 B2 * | 3/2002 | Peters | ............... | A63B 53/00 473/291 |
| 6,530,846 B1 * | 3/2003 | Mase | ............... | A63B 53/00 473/290 |
| 6,554,719 B2 * | 4/2003 | Peters | ............... | A63B 53/00 473/291 |
| 6,592,468 B2 * | 7/2003 | Vincent | ............... | A63B 53/047 473/334 |
| 6,592,469 B2 * | 7/2003 | Gilbert | ............... | A63B 53/04 473/291 |
| 6,595,876 B2 | 7/2003 | Kasashima et al. | | |
| 6,616,547 B2 | 9/2003 | Vincent et al. | | |
| 6,638,183 B2 * | 10/2003 | Takeda | ............... | A63B 53/047 473/335 |
| 6,695,937 B1 * | 2/2004 | Stites, III | ............... | A63B 53/0466 148/577 |
| 6,719,647 B2 | 4/2004 | Sajima | | |
| 6,814,674 B2 | 11/2004 | Clausen et al. | | |
| 6,923,733 B2 * | 8/2005 | Chen | ............... | A63B 53/047 473/305 |
| 6,945,880 B2 | 9/2005 | Aoyama et al. | | |
| 7,018,309 B2 | 3/2006 | Kasashima et al. | | |
| 7,040,000 B2 * | 5/2006 | Takeda | ............... | A63B 53/04 29/505 |
| 7,048,647 B2 * | 5/2006 | Burrows | ............... | A63B 53/047 473/334 |
| 7,086,964 B2 * | 8/2006 | Chen | ............... | A63B 53/047 473/324 |
| 7,090,590 B2 * | 8/2006 | Chen | ............... | A63B 53/047 473/324 |
| 7,131,913 B2 * | 11/2006 | Iwata | ............... | A63B 53/04 473/350 |
| 7,316,623 B2 * | 1/2008 | Imamoto | ............... | A63B 53/047 473/332 |
| 7,380,325 B2 * | 6/2008 | Takeda | ............... | A63B 53/04 29/505 |
| 7,393,287 B2 * | 7/2008 | Huang | ............... | A63B 53/04 473/329 |
| 7,513,835 B2 * | 4/2009 | Belmont | ............... | A63B 53/0466 473/328 |
| 7,591,735 B2 | 9/2009 | Matsunaga et al. | | |
| 7,789,772 B2 | 9/2010 | Sukman | | |
| 7,811,179 B2 | 10/2010 | Roach et al. | | |
| 7,815,523 B2 | 10/2010 | Bennett et al. | | |
| 7,828,674 B2 * | 11/2010 | Kubota | ............... | A63B 53/047 473/335 |
| 7,909,706 B2 * | 3/2011 | Cole | ............... | A63B 53/02 473/305 |
| 7,976,403 B2 * | 7/2011 | Gilbert | ............... | A63B 53/0475 473/309 |
| 7,980,960 B2 * | 7/2011 | Gilbert | ............... | A63B 53/047 473/290 |
| 8,079,918 B2 * | 12/2011 | Cole | ............... | A63B 53/02 473/305 |
| 8,133,133 B2 * | 3/2012 | Gilbert | ............... | A63B 53/04 473/312 |
| 8,323,122 B2 * | 12/2012 | Soracco | ............... | A63B 53/04 473/349 |
| 8,434,671 B1 * | 5/2013 | Su | ............... | A63B 53/04 228/227 |
| 8,454,453 B2 * | 6/2013 | Hettinger | ............... | A63B 53/02 473/350 |
| 8,870,683 B2 * | 10/2014 | Hettinger | ............... | A63B 53/02 473/349 |
| 9,155,942 B2 * | 10/2015 | Ueda | ............... | A63B 53/02 |
| 2006/0035721 A1 * | 2/2006 | Knutson | ............... | A63B 53/047 473/335 |
| 2014/0031143 A1 | 1/2014 | Hettinger et al. | | |
| 2015/0026948 A1 | 1/2015 | Hettinger et al. | | |

FOREIGN PATENT DOCUMENTS

| | | | |
|---|---|---|---|
| JP | 407255879 A1 | 10/1995 | |
| JP | 08024374 A * | 1/1996 | |
| JP | 408024374 A1 | 1/1996 | |
| JP | 08089602 A * | 4/1996 | |
| JP | 408089602 A1 | 4/1996 | |
| JP | 09154986 A * | 6/1997 | |
| JP | 409154986 A1 | 6/1997 | |
| JP | 09271544 A * | 10/1997 | |
| JP | 409271544 A1 | 10/1997 | |
| JP | 10151231 A * | 6/1998 | |
| JP | 410151231 A1 | 6/1998 | |
| JP | 11057085 A * | 3/1999 | |
| JP | 411057085 A1 | 3/1999 | |
| JP | 11128409 A * | 5/1999 | |
| JP | 411128409 A1 | 5/1999 | |
| JP | 2001212270 A * | 8/2001 | |
| JP | 2001212270 A1 | 8/2001 | |
| JP | 2006110348 A * | 4/2006 | |
| JP | 2006-167033 A1 | 6/2006 | |
| JP | 2007325932 A * | 12/2007 | |
| JP | 2007325932 A1 | 12/2007 | |
| JP | 2009-095589 A1 | 5/2009 | |
| JP | 2011004810 A * | 1/2011 | |
| JP | 2011004810 A1 | 1/2011 | |

* cited by examiner

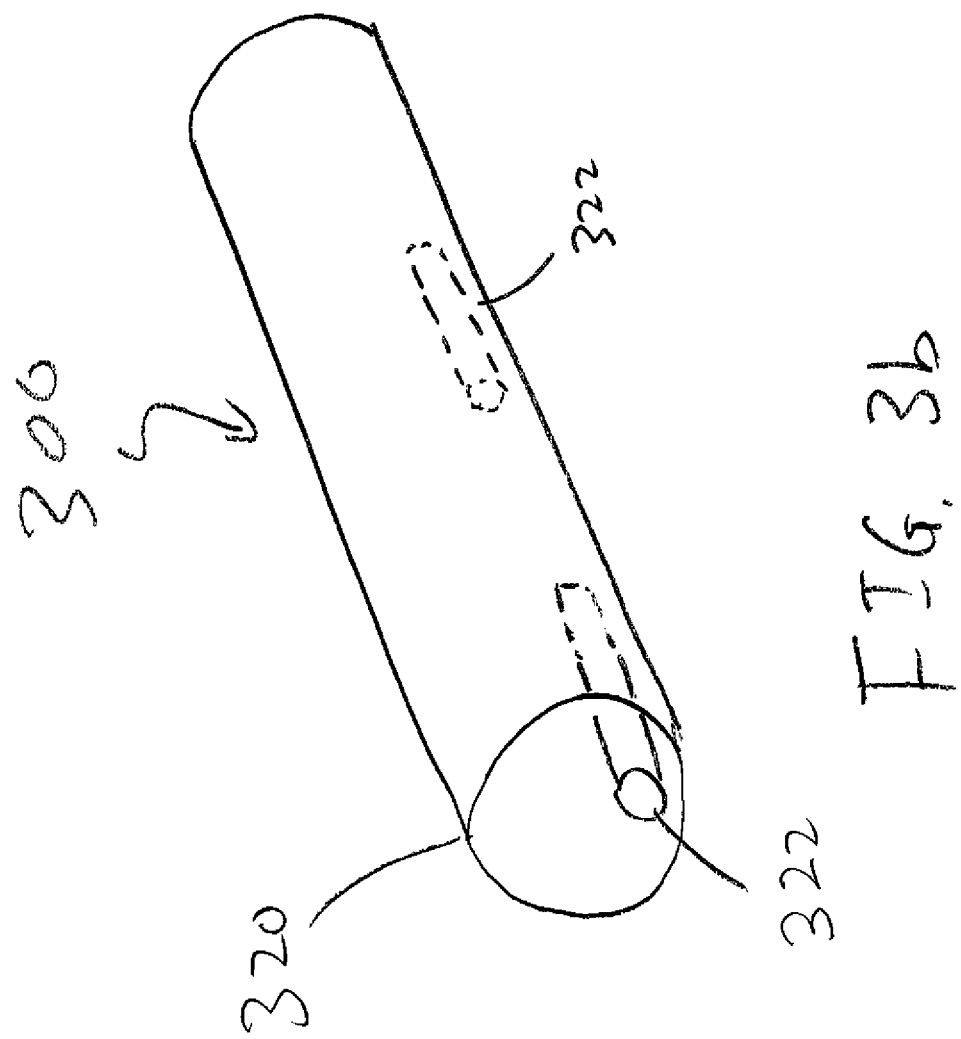

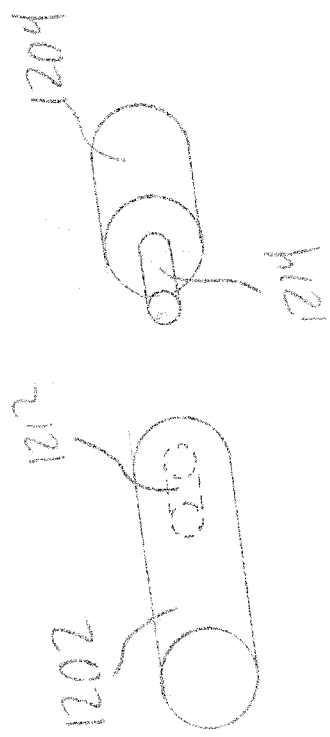
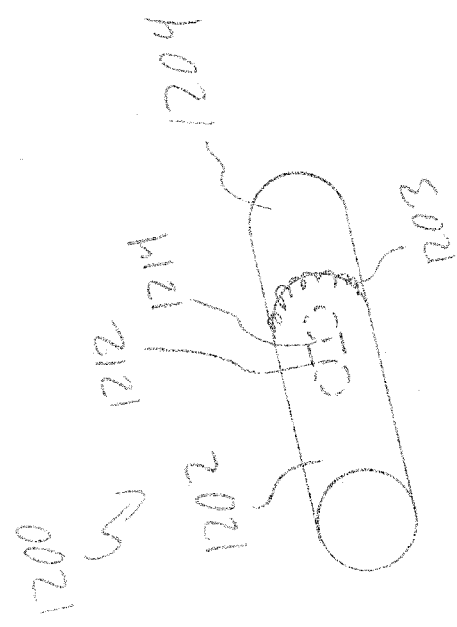

MULTI-MATERIAL IRON TYPE GOLF CLUB HEAD

CROSS-REFERENCE TO RELATED APPLICATIONS

The present invention is a Continuation in Part of U.S. patent application Ser. No. 14/512,270, filed on Oct. 10, 2014, which is Divisional of U.S. patent application Ser. No. 13/894,660, filed on May 15, 2013, now U.S. Pat. No. 8,870,683, which is a Continuation of U.S. patent application Ser. No. 13/043,985, filed on Mar. 9, 2011, now U.S. Pat. No. 8,454,453, the disclosure of each incorporated by reference in their entirety.

FIELD OF THE INVENTION

The present invention relates generally to an iron type golf club head that utilizes different materials to improve the performance of the golf club head. More specifically, the present invention relates to a golf club head that utilizes different materials to construct different portions of the iron type golf club head in order to reduce weight from undesirable portions of the golf club head; all while maintaining the strength and durability characteristics typically associated with a golf club head that is formed out of an unitary material. Because the performance of a golf club head is so dependent upon the Center of Gravity (CG) location as well as the Moment of Inertia (MOI) of the golf club head itself, saving weight from undesirable portions of the golf club head creates more discretionary weight, which can be placed at strategic locations that improves the CG and MOI characteristics of the golf club head. Hence, the golf club head in accordance with the present invention achieves both of the objectives mentioned above by increasing the amount of discretionary weight to improve performance while maintaining the solid feel generally associated with a solid unitary golf club.

BACKGROUND OF THE INVENTION

In order to continually improve the performance of a golf club, golf club designers are constantly searching for new and innovative ways make a golf club perform better. Although what constitutes better performance for golf club is debatable, the great popularity of the game of golf has required golf club designers to create a golf club that performs better for your average everyday golfer, who may not have the perfect golf game day in and day out.

It is worthwhile to recognize here that when your average golfer swings a golf club, he or she may not always have a replicable golf swing; often resulting in the golf club impacting the golf ball at different locations on the golf club face. Needless to say, it is difficult for any golf club to achieve consistent result when the impact between the golf club and the golf ball isn't consistent. Although this specific problem with impact consistency decreases with an increase in experience and skill level, it is something that even the best golfer will inevitably struggle with from time to time. Hence, in order to address this issue of inconsistency of impact that can lead to inconsistent performance, golf club designers need to come up with golf clubs that can minimize the undesirable effects from such off-center impact. U.S. Pat. No. 5,395,113 to Antonious provides one example of one of the earlier attempt to address this issue by providing an iron type golf club with a weight configuration that utilizes peripheral weights that extend around a rear surface of the club head. Without going into too much physics about the MOI of a golf club head as well as the CG location, the shifting of these weights shown by U.S. Pat. No. 5,395,113 address the problem of inconsistent impact by prohibiting the golf club head from twisting when it is struck off center.

U.S. Pat. No. 7,789,772 to Sukman provides another example of a methodology used to minimize the adverse effects of inconsistent impact by adjusting the thicknesses of various portions of the golf club head. More specifically, U.S. Pat. No. 7,789,772 discloses a golf club head comprising of a sink portion having a variation in heel-to-toe contour while maintaining a low-order front-to-rear contour resulting in an iron type golf club having a unique weighting distribution.

Although the above mentioned attempts to improve the performance of the golf club in terms of manipulating the thicknesses at various portions of the golf club head are admirable, they fail to take in consideration of the performance gains that are possible by using alternative materials having different densities that could accentuate the weighting affects. Recent golf club designers, in order to further improve the performance of a golf club head, have recognized the performance advantages that could be achieved using alternative materials by experimenting with materials having different densities. U.S. Pat. No. 6,814,674 to Clausen et al. illustrates one of the more recent attempts that incorporate different components to construct a golf club head. More specifically, U.S. Pat. No. 6,814,674 discloses three different components, a periphery member, a central member, and a face plate; all made out of different materials to improve the CG and MOI of the golf club head by creating more discretionary weight than previously possible.

Although these recent attempts at utilizing multiple materials having different material properties can dramatically increase the amount of discretionary weight, it does so at the expense of sacrificing the feel of a golf club head. Feel of a golf club head, although a difficult criteria to quantify, generally results from the capability of a golf club to feel solid upon impact with the golf ball. This type of solid feedback is generally achieved by having the golf club head formed out of a unitary solid structure, as the structural integrity of this type of unitary solid structure clubs allows the energy of the impact to be felt by a golfer in a consistent manner.

Hence, it can be seen from above, there exists a need for a golf club to provide a more even balance between forgiveness and feel. More specifically, there is a need in the field for a golf club head that utilizes a substantially uniform material throughout the body portion of the golf club head to maintain the feel that is generally associated with a solid golf club; all while pushing the boundaries of performance by creating the maximum discretionary weight that can be used to improve the MOI and CG location of the golf club head.

BRIEF SUMMARY OF THE INVENTION

One non-limiting embodiment of the present technology includes an iron type golf club head comprising: a blade portion located near a terminal end of said iron type golf club head, said blade portion defining a striking face adapted for striking a golf ball and a rear surface, wherein over 50% of said blade portion is made out of a first material; a hosel portion located near a proximal end of said iron type golf club head, wherein over 50% of said hosel portion is made out of a second material; and a bifurcation plane defined as a plane that is perpendicular to said striking face positioned at a distance of 30 mm heel-ward along an X-axis from a face center of said iron type golf club head, said bifurcation plane separating said blade portion from said hosel portion; wherein said first material has a yield strength greater than about 570 MPa; wherein said second material has a yield strength less than about 570 MPa.

In an additional non-limiting embodiment of the present technology over 70% of said blade portion is made out of a first material and wherein over 70% of said hosel portion is made out of a second material.

In an additional non-limiting embodiment of the present technology over 90% of said blade portion is made out of a first material and wherein over 90% of said hosel portion is made out of a second material.

In an additional non-limiting embodiment of the present technology said first material comprises greater than 0.10% carbon content by weight and wherein said second material comprises less than 0.10% carbon content by weight.

In an additional non-limiting embodiment of the present technology said first material comprises greater than 0.10% carbon content by weight and wherein said second material comprises less than 0.10% carbon content by weight.

In an additional non-limiting embodiment of the present technology said first material is 17-4 stainless steel and said second material is 304 stainless steel.

In an additional non-limiting embodiment of the present technology said first material is 17-4 stainless steel and said second material is 304 stainless steel.

An additional non-limiting embodiment of the present technology includes an iron type golf club head comprising: a blade portion located near a terminal end of said iron type golf club head, said blade portion defining a striking face adapted for striking a golf ball and a rear surface, wherein over 50% of said blade portion is made out of a first material; a hosel portion located near a proximal end of said iron type golf club head, wherein over 50% of said hosel portion is made out of a second material; and a bifurcation plane defined as a plane that is perpendicular to said striking face positioned at a distance of 30 mm heel-ward along an X-axis from a face center of said iron type golf club head, said bifurcation plane separating said blade portion from said hosel portion; wherein said blade portion has an average Brinell HB hardness greater than about 275; wherein said hosel portion has an average Brinell HB hardness less than about 275.

In an additional non-limiting embodiment of the present technology said hosel portion has an average Brinell HB hardness less than about 250.

In an additional non-limiting embodiment of the present technology said hosel portion has an average Brinell HB hardness less than about 225.

In an additional non-limiting embodiment of the present technology said hosel portion has an average Brinell HB hardness less than about 200.

In an additional non-limiting embodiment of the present technology said hosel portion has an average Brinell HB hardness less than about 175.

In an additional non-limiting embodiment of the present technology said hosel portion has an average Brinell HB hardness less than about 150.

In an additional non-limiting embodiment of the present technology said hosel portion has an average Brinell HB hardness less than about 125.

An additional non-limiting embodiment of the present technology includes a method of forming an iron type golf club head comprising: providing a blade portion in the form of a rod, said blade portion made out of greater than 50% of a first material having a first yield strength; providing a hosel portion in the form of a rod, said hosel portion out of greater than 50% of a second material having a second yield strength; welding said blade portion together with said hosel portion into a pre-form billet; forging said pre-form billet into a desired shape for said iron type golf club head; wherein said first yield strength is greater than about 570 MPa; wherein said second yield strength is less than about 570 MPa; wherein the separation between said blade portion and said hosel portion is defined by a bifurcation plane, defined as a plane that is perpendicular to a striking face of said iron type golf club head, positioned at a distance of 30 mm heel-ward along an X-axis from a face center of said iron type golf club head;

In an additional non-limiting embodiment of the present technology over 70% of said blade portion is made out of a first material and wherein over 70% of said hosel portion is made out of a second material.

In an additional non-limiting embodiment of the present technology over 90% of said blade portion is made out of a first material and wherein over 90% of said hosel portion is made out of a second material.

In an additional non-limiting embodiment of the present technology said blade portion in the form of a rod further comprises a first locating feature and wherein said hosel portion in the form of a rod further comprises a second locating feature, wherein said first locating feature is configured to cooperate with said second locating feature to locate said blade portion relative to said second portion during welding.

An additional non-limiting embodiment of the present technology includes rotating said blade portion in the form of a rod relative to said hosel portion in the form of a rod, locking said blade portion to said hosel portion.

An additional non-limiting embodiment of the present technology includes welding around the perimeter of the intersection of said blade portion in the form of a rod and said hosel portion in the form of a rod.

These and other features, aspects and advantages of the present invention will become better understood with references to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

FIG. 3b shows a perspective view of a pre-form billet used to create a golf club head in accordance with an alternative embodiment of the present invention;

FIG. 12A shows a perspective view of a blade portion in the form of a rod and a hosel portion in the form of a rod, each including a locating feature, in accordance with an exemplary embodiment of the present invention;

FIG. 12B shows a perspective view of a pre-form billet used to create a golf club head in accordance with an exemplary embodiment of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any or all of the problems discussed above or may only address one of the problems discussed above. Further, one or more of the problems discussed above may not be fully addressed by any of the features described below.

Figure 1:
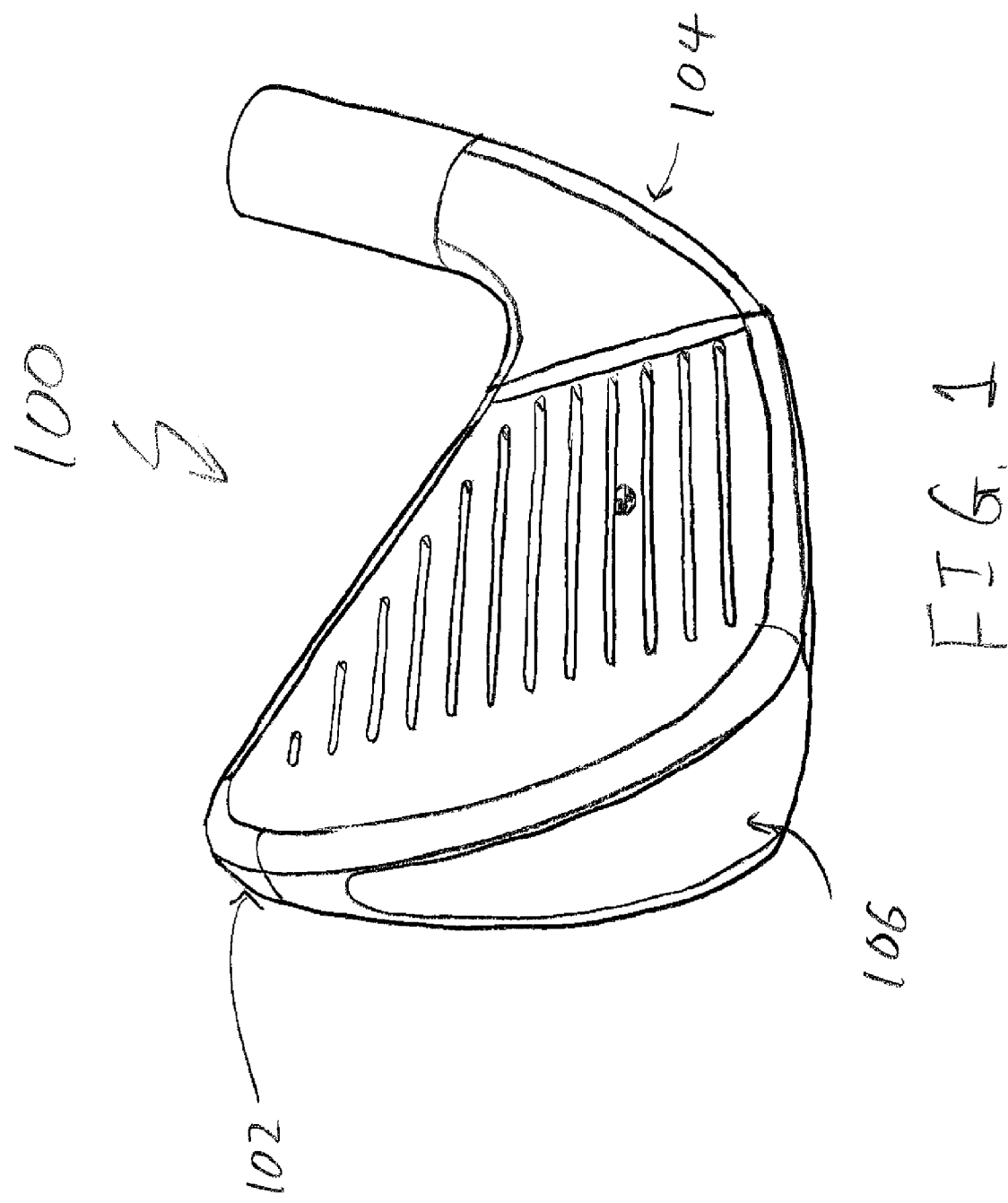
FIG. 1 shows a perspective view of a golf club head in accordance with an exemplary embodiment of the present invention.

FIG. 1 of the accompanying drawings shows a perspective view of a golf club head 100 in accordance with an exemplary embodiment of the present invention. More specifically, FIG. 1 shows a golf club head 100 comprising out of three separate and distinct metallic alloy parts. First, the golf club head 100 shown in the current exemplary embodiment of the present invention may comprise a blade portion 102 located near a terminal end of the golf club head, wherein the blade portion 102 is made out a lightweight iron-aluminum alloy material to save weight from the blade portion 102 of the golf club head. Secondly, the golf club head 100 may comprise a hosel portion 104 located near a proximal end of the golf club head, wherein the hosel portion 104 is made out of a conventional carbon steel material to preserve the traditional performance needs of a sturdy hosel portion. Finally, golf club head 100 may have a sole insert 106 located near a bottom of the golf club head, wherein the sole insert 106 is made out of a heavy tungsten alloy material to shift the discretionary weight saved from the blade portion 102 to a location that can be controlled using the heavier denser material. It should be noted that the materials discussed above for the various components are only illustrative and shouldn't be construed as exhaustive; other materials may be used in other embodiments of the present invention without departing from the scope and content of the present invention so long as it meets the density requirements below.

Blade portion 102 of the golf club head 100, as shown in the current exemplary embodiment, may generally be comprised out of a first material that has a first density of less than about 7.10 grams/cc, more preferably less than about 7.05 grams/cc, and most preferably less than about 7.00 grams/cc. In one exemplary embodiment, this first material may be a lightweight iron-aluminum material for its lightweight property; however, numerous other lightweight metallic materials may be used to achieve the same weight savings without departing from the scope and content of the present invention. Hosel portion 104 of the current inventive golf club head 100 may generally be comprised out of a second material having a second density of between about 7.75 grams/cc to about 7.95 grams/cc, more preferably between about 7.80 grams/cc to about 7.90 grams/cc, and most preferably about 7.85 grams/cc. In one exemplary embodiment, this second material may be a standard carbon steel for its strength and malleable characteristics, however, numerous other materials may be used without departing from the scope and content of the present invention so long as it has a second density in the ranges described above. Sole insert 106 of the golf club head 100 may generally be comprised out of a third material having a third density of greater than about 11.00 grams/cc, more preferably greater than about 11.50 grams/cc, and most preferably greater than about 12.00 grams/cc. In one exemplary embodiment, this third material may be a tungsten alloy for its heavy density characteristics; however, numerous other materials may be used without departing from the scope and content of the present invention so long as it has a third density in the range described above.

Although the current exemplary embodiment is illustrated using three different materials to create the blade portion 102 of the golf club head 100, additional materials may be used without departing from the scope and content of the present invention. More specifically, the blade portion 102 may be constructed out of four different materials, five different materials, six different materials, or any number of different materials without departing from the scope and content of the present invention.

It is worth noting here that the first, second, and third material used in this current exemplary embodiment of the present invention may all generally be a metallic type material that can be easily welded to one another. This ability of the various components to be easily welded to one another provides great performance advantage because it allows the finished product to maintain a consistent solid feel; something that is difficult to accomplish when contrasting materials such as a metal and a plastic are combined to form a golf club head. In a current exemplary embodiment of the present invention shown in FIG. 1, the blade portion 102 and the hosel portion 104 may generally be forged from a single pre-form billet is spin welded together from two individual rods, allowing the finished product to achieve the solid structural integrity generally associated with a golf club formed from a uniform material. Once the pre-form billet is forged into its desired shape, a sole cavity may cut out using a cutter to create space for the sole insert 106; which itself may be welded into its final resting place within the golf club head 100.

Figure 2:
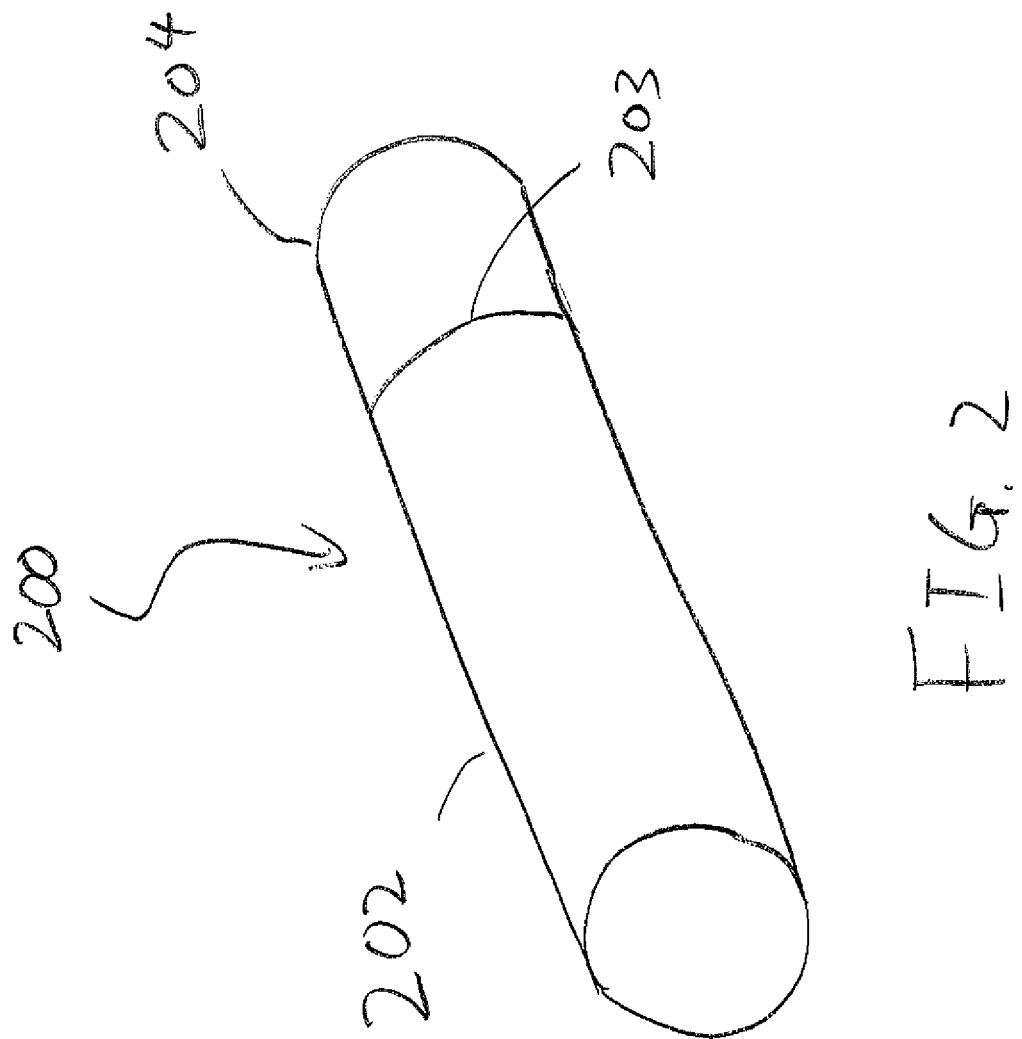
FIG. 2 shows a perspective view of a pre-form billet used to create a golf club head in accordance with an exemplary embodiment of the present invention.

FIG. 2 of the accompanying drawings shows a perspective view of a pre-form billet 200 used to form the golf club head 100 shown in FIG. 1. Per-form billet 200, as shown in FIG. 2 may generally have a blade portion 202 and a hosel portion 204 separated by a bifurcation plane 203. The blade portion 202 and the hosel portion 204 are generally spun welded together using traditional friction welding techniques. Friction welding, as discussed in this current application, may generally refer to a solid-state welding process that generates heat through mechanical friction between a moving workpiece and a stationary component, with the addition of a lateral force called "an upset" to plastically displace and fuse the materials together. Although actual no melting of the material occurs, this process is commonly known as friction welding due to the fact that it is capable of combining two materials together. Preferably, spin welding techniques that uses traditional friction welding is used in this current exemplary embodiment, however, other attachment techniques can be used without departing from the scope and content of the present invention so long as it is capable joining two different materials into a pre-form billet 200.

Figure 3A:
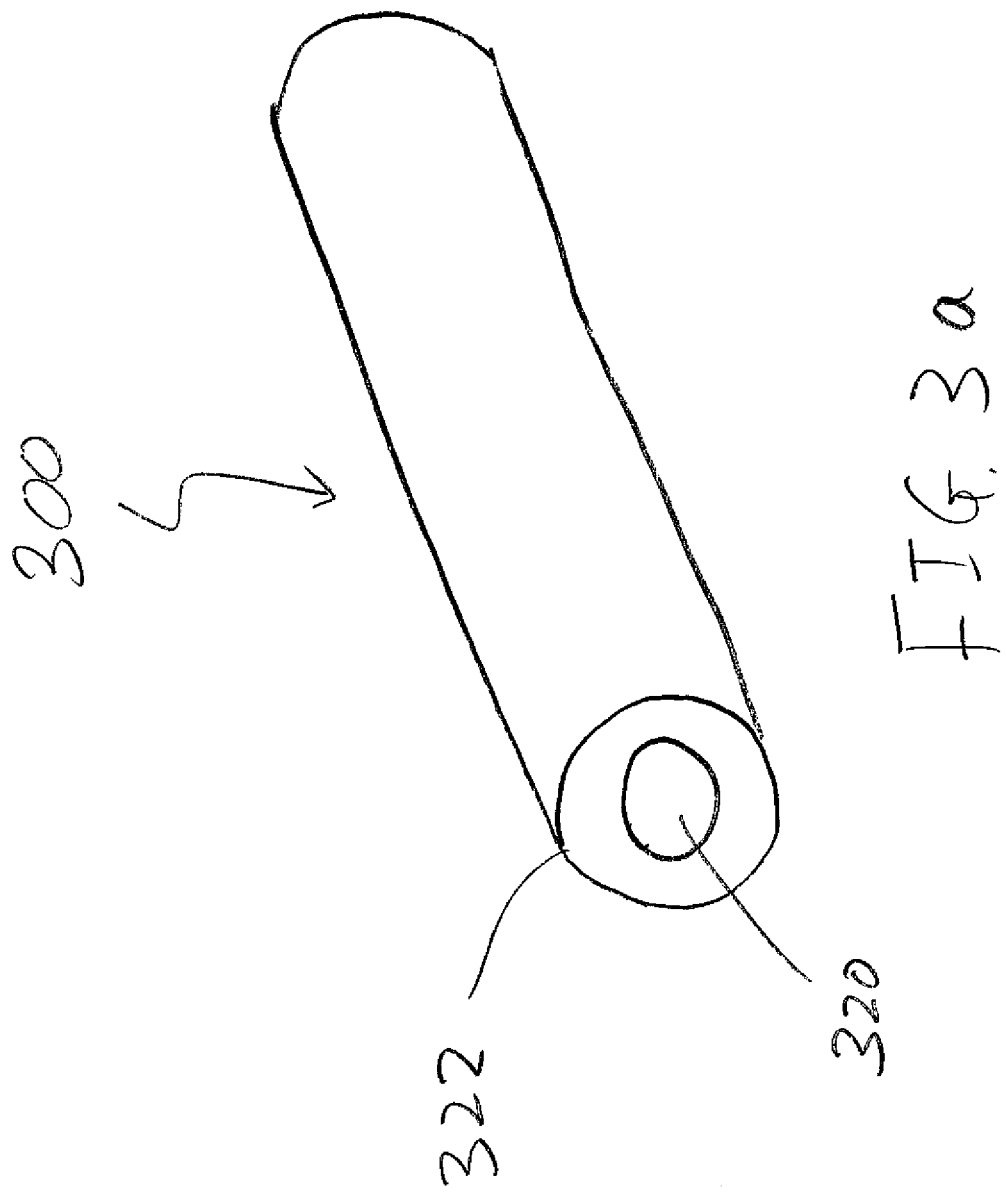
FIG. 3a shows a perspective view of a pre-form billet used to create a golf club head in accordance with an alternative embodiment of the present invention.

FIG. 3a of the accompanying drawings shows a pre-form billet 300 in accordance with an alternative embodiment of the present invention that can be used to achieve the same weight savings by pre-form billet 200 shown in FIG. 2 using a different construction. More specifically, pre-form billet 300 in this alternative embodiment of the present invention, may have a lightweight material 320 being wrapped around by a denser material 322 to create the pre-form billet 300 that is capable of achieving the same lightweight properties needed by the golf club head 100 (shown in FIG. 1). In this current exemplary embodiment of the present invention the lightweight material 320 may have a density of less than about 7.10 grams/cc, more preferably less than about 7.05 grams/cc, and most preferably less than about 7.00 grams/cc; while the denser material 322 may have a density of between about 7.75 grams/cc to about 7.95 grams/cc, more preferably between about 7.80 grams/cc to about 7.90 grams/cc, and most preferably about 7.85 grams/cc.

FIG. 3b of the accompanying drawings shows a further alternative embodiment of the present invention wherein the pre-form billet 300 could have dense materials 322 placed at strategic locations within the pre-form billet 300 that is substantially constructed out of a lightweight material 320. In this current exemplary embodiment of the present invention, the golf club head 300 could be formed in a way to allow for strategic adjustment of the weighting characteristics of a golf club head without the need for post operations. In the embodiment shown in FIG. 3b the placement of the dense materials 322 within the pre-form billet 300 may coincide with the a lower heel and lower toe portion of a golf club head to increase the moment of inertia of the finalized product without departing from the scope and content of the present invention. Although the current exemplary embodiment utilizes dense materials 322 embedded within a lightweight material 320, the actual densities of the relative components could be adjusted to meet the weighting needs of a golf club head without being restricted to the drawing provided in FIG. 3b.

Figure 4:
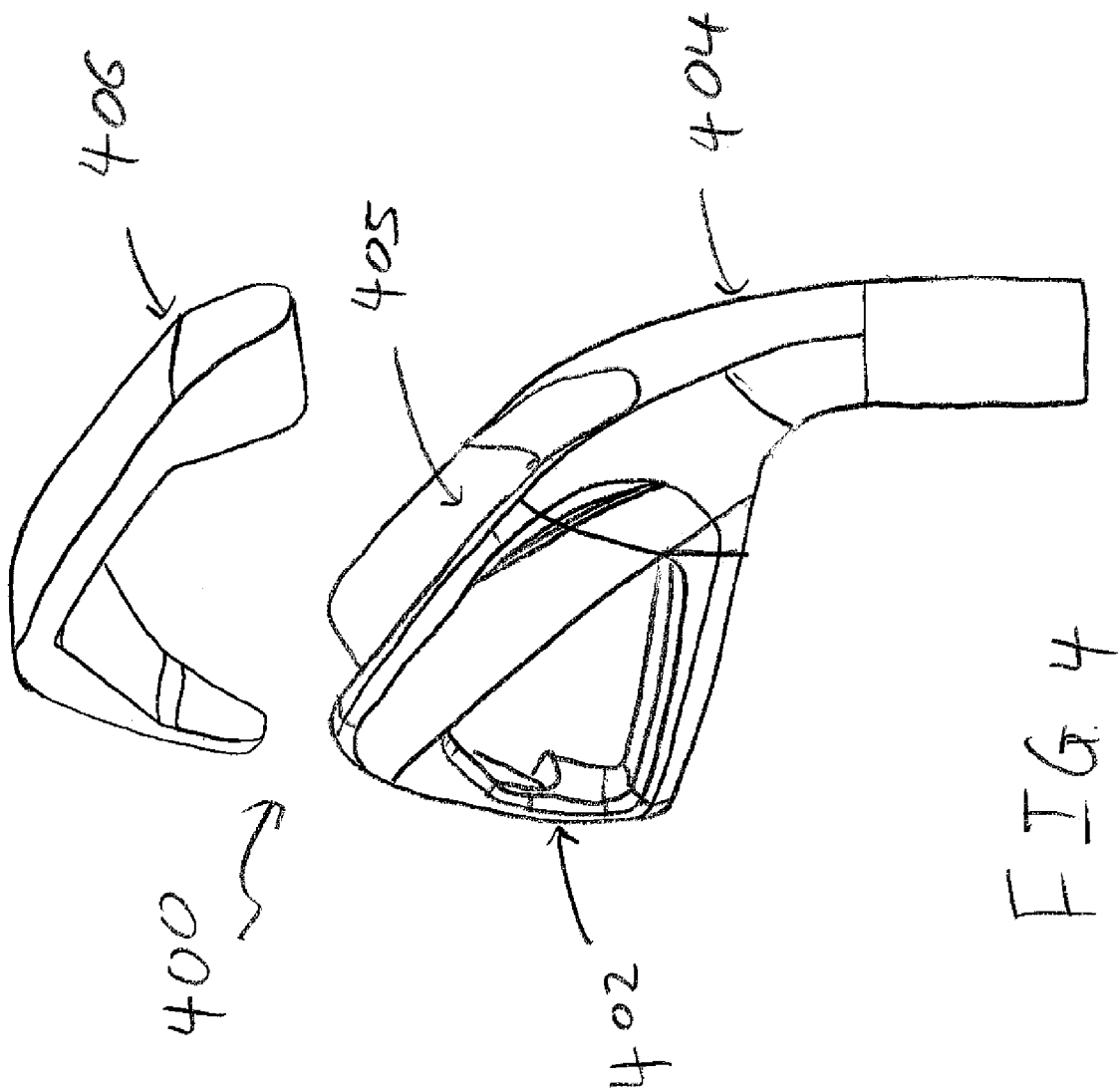
FIG. 4 shows an exploded perspective view of a golf club head in accordance with an exemplary embodiment of the present invention.

FIG. 4 of the accompanying drawings showing an exploded view of golf club head 400 with the sole insert 406 shifted out from the body of the golf club head 400 to provide a clearer illustration of the relationship of the various components. More specifically FIG. 4 of the accompanying drawings shows the golf club head 400 having the same blade portion 402, the same hosel portion 404, and the same sole insert 406 as previously discussed; however, the exploded view of the golf club head 400 shown in FIG. 4 allows the sole cavity 405 to be shown. Sole cavity 405, as shown in the current exemplary embodiment, may generally be cut out from the forged blade portion 402 and the hosel portion 404 spanning across both of these portions to cover a significant portion of the golf club head 400. Because Blade portion 402 and the hosel portion 404 are generally spun welded together to form a pre-form billet, the golf club head 400 may generally be created using a forged process to maintain the separation of the two different components. However, in alternative embodiment of the present invention, golf club head 400 may be formed using different process such as a casting process if alternative methodologies allow the separation between the blade portion 402 and the hosel portion 404 to be maintained without departing from the scope and content of the present invention.

The exploded view of golf club head 400 shown in FIG. 4 also allows the sole profile of the golf club head 400 to be shown as it relates to the sole insert 406. More specifically, sole insert 406, in accordance with the current exemplary embodiment of the present invention, may generally have an outer surface that has a shape being congruent with the external curvatures of the sole of the golf club head. Alternatively speaking, the outer sole surface of the sole insert 406 has a shape that compliments the contour of the perimeter of the sole cavity 405.

In addition to illustrating the sole cavity 405 more clearly, FIG. 4 of the accompanying drawings is also capable of showing the size, shape, and geometry of the sole insert 406. At first glance, it is apparent that the shear volume of the sole insert 406 is significantly greater than prior art dense sole inserts due to the amount of weight that can be saved from the remainder of the golf club head 400 via the usage of the lightweight first material in the blade portion 402. More specifically, the volume of the sole insert 406, as shown in this current exemplary embodiment of the present invention, is generally greater than about 7.50 cubic centimeters, more preferably greater than about 7.6 cubic centimeters, and most preferably greater than about 7.69 cubic centimeters. This type of increased volume for the sole insert 406, combined with the heavier third material used to create the sole insert 406, may generally yield a sole insert with a total weight of greater than about 90 grams, more preferably greater than about 91 grams, and most preferably greater than about 92 grams.

Because the overall weight of an iron type golf club head 400 is generally kept consistent at about 240 grams to about 250 grams, the ability to achieve a sole insert 406 in the weight ranges discussed above must be accompanied by a significant weight reduction at alternative locations of the golf club head 400. Recognizing this, it is worthwhile to explain that the present invention achieves this weight reduction by minimizing the weight of the blade portion 402 of the golf club head 400 via a lightweight first material for the entire blade portion of the golf club head 400. More specifically, the present invention utilizes a low density iron-aluminum alloy material as one way achieve this significant amount of weight reduction; however numerous other types of material may be used to reduce the overall weight of the blade portion 402 of the golf club head 400 without departing from the scope and content of the present invention.

Figure 5:
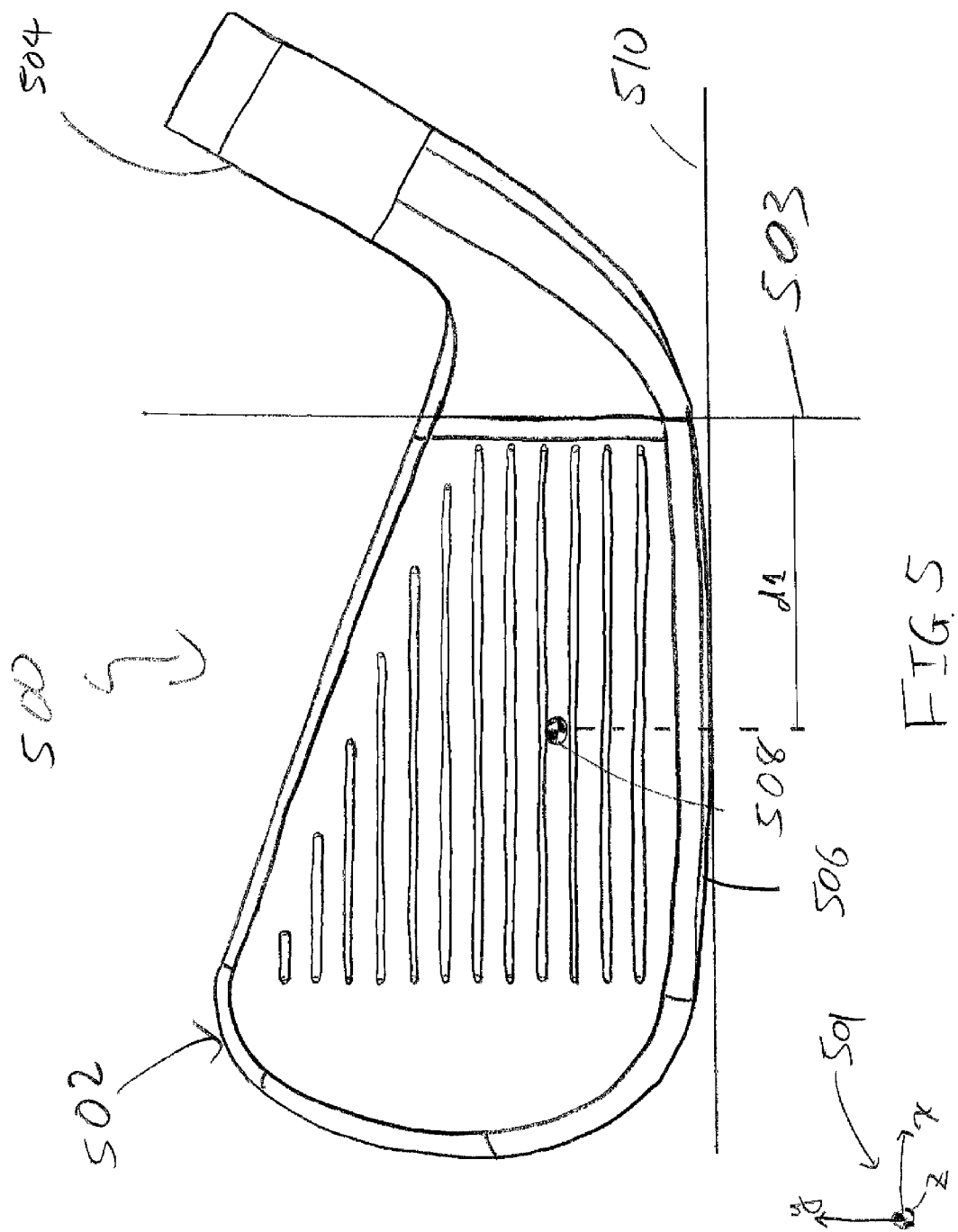
FIG. 5 shows a frontal view of a golf club head in accordance with an exemplary embodiment of the present invention that defines a coordinate system.

In order to further explain the ability of the current inventive golf club head 400 to incorporate a blade portion 402 that is made out of a first material while maintaining a hosel portion 404 that is made out of a second material, FIG. 5 is presented here showing a frontal view of a golf club head 500 in accordance with an exemplary embodiment of the present invention allowing the blade portion 502 and the hosel portion 504 to be more clearly defined.

Golf club head 500 in accordance with the exemplary embodiment of the present invention shown in FIG. 5 may generally show a "face center" 508 as well as a bifurcation plane 503. "Face center" 508, as defined in the current application, does not actually refer to the geometric center of the striking face itself, but in reality refer to an easily replicable location based off the scorelines on the striking face of the golf club head 500. More specifically, "face center" 508, as referred to in the current application, is located on the striking face plane at a location that is at the midpoint along the length of the scorelines along the X-axis of the coordinate system 501 and at a point that is 15 mm away from the ground 510 along the Y-axis of the coordinate system 501. The location of this "face center" 508 is crucial in the current invention because the bifurcation plane 503 that separates the blade portion 502 from the hosel portion 504 is defined based off this "face center" 508. Bifurcation plane 503, as defined in the current application, may generally refer to a plane that is perpendicular to the striking face plane and located at a distance d1 of exactly 30 mm heel-ward from the "face center" 508 of the golf club head 500 along the X-axis.

Because the bifurcation plane 503 is defined by the "face center" 508, whose exact location could differ when different scoreline patterns are used, the exact separation between the two portions are not necessarily captured by the bifurcation plane 503. However, the bifurcation plane 503 is useful in determining the amount of weight that can be removed from the blade portion 502 of the golf club head 500 by utilizing the lightweight first material discussed earlier. More specifically, a ratio of the weight of the blade portion 502; defined by the portion of the golf club head 500 that is toe-ward from the bifurcation plane 503, divided by the weight of the hosel portion 504; defined by the portion of the golf club head 500 that is heel-ward from the bifurcation plane 503, is generally less than about 2.0, more preferably less than about 1.90, and most preferably less than about 1.80. In order to achieve the ratio above, the weight of the blade portion 502 may generally be less than about 110 grams, more preferably less than about 105 grams, and most preferably less than 100 grams; while the weight of the hosel portion 504 may generally be greater than about 55 grams, more preferably greater than about 55.25 grams, and most preferably greater than about 55.5 grams.

It should be noted here that in this current exemplary embodiment of the present invention, the ratio of the weights of the blade portion 502 relative to the hosel portion 304 excludes the weighted sole insert 506. Despite the clear concise definition given above for the boundaries between the blade portion 502 and the hosel portion 504, the boundaries of the sole insert 506 to be excluded from the relative weight above is less obvious. Hence, in order to provide a clearer definition about the boundaries of the sole insert 506, the present invention provides several different methodologies; which can all be used interchangeably to define the boundaries of the sole insert 506.

In one exemplary embodiment of the present invention, the boundaries of the sole insert 506 can be defined as portion of the golf club head that is made out of a third material having a density of greater than 10.0 grams/cc. Under this current definition the boundary of the sole insert 506 from the remainder of the body of the golf club head 500 is easily identifiable because they are formed from two very distinct materials having very different densities. Alternatively, in another exemplary embodiment of the present invention, the boundaries of the sole insert 506 can be defined by using geometric shapes defined using the sole cavity (shown in FIG. 4). In order to provide a clearer view of the sole cavity in a way that allows it to be easily defined geometrically, FIG. 6 is provided to show the boundaries of the sole cavity 605.

Figure 6:
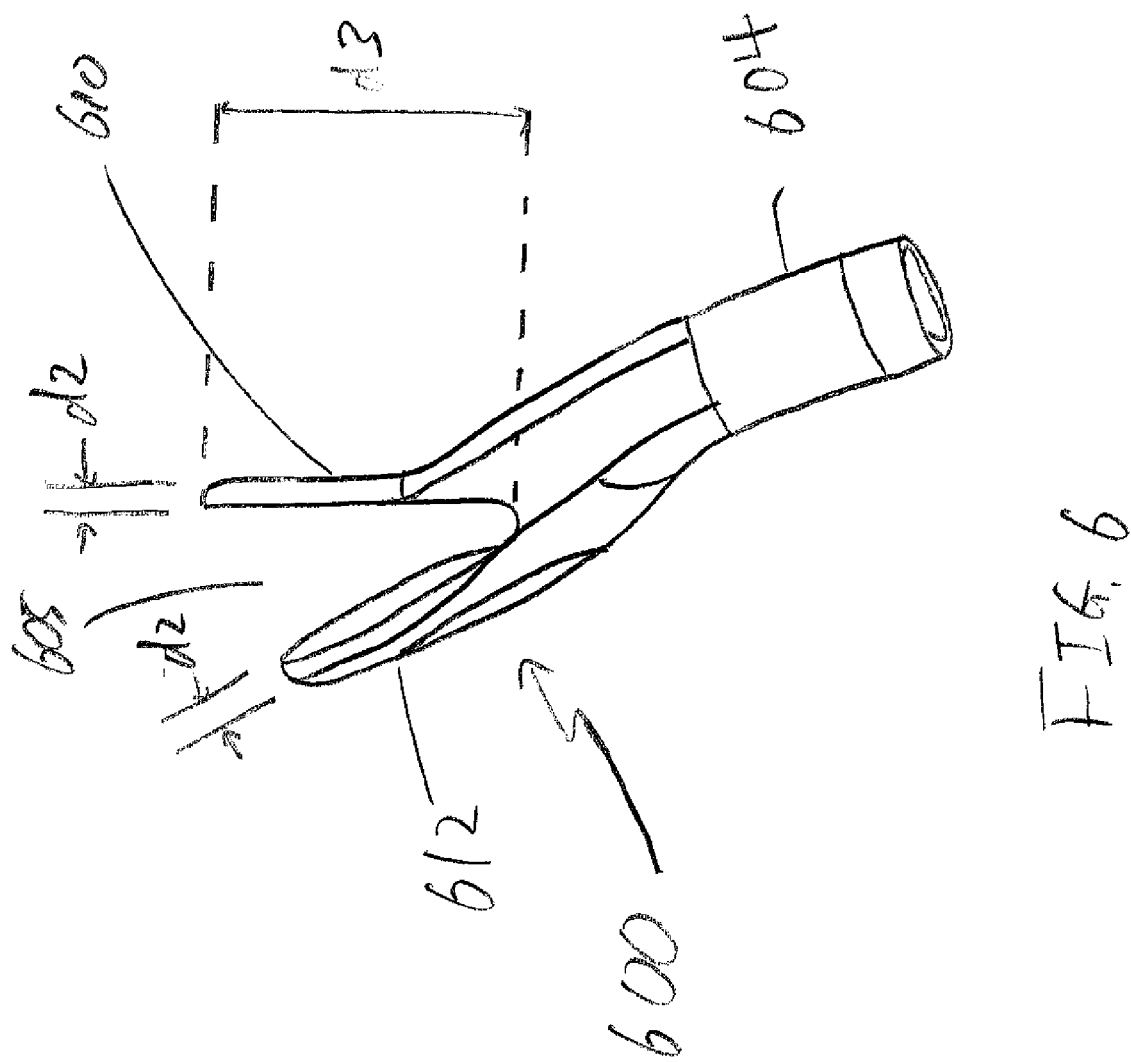
FIG. 6 shows a perspective view of a golf club head without a sole insert in accordance with an exemplary embodiment of the present invention.

FIG. 6 of the accompanying drawings shows a perspective view of a golf club head 600 in accordance with an exemplary embodiment of the present invention oriented in a way to illustrate the boundaries of the sole insert 506 (shown in FIG. 5) through the sole cavity 605. More specifically, FIG. 6 shows how the sole cavity 605 can be defined geometrically by the amount of offset from the planar striking face 610 of the golf club head. Alternatively speaking, sole cavity 605 can be formed by a cut that is offset by a distance d2 of 2.8 mm away from the striking face 610 of the golf club head 600. In order to maintain a consistent thickness at the frontal portion and the rear portion of the golf club head 600, the cut used to form the rear surface of the sole cavity 605 may also be offset by a distance d2 of 2.8 mm away from the rear surface 612 of the golf club head 600. It is worth recognizing that in this current exemplary embodiment of the present invention the rear surface 612 of the golf club head 600 may be a curved surface, hence sole cavity 605 may have a curved surface near the rear surface 612 to match. Finally, the depth of the cut of the sole cavity 605 within the current embodiment may generally be defined by a distance d3 of 34 mm, measuring from the top surface of the sole onto the bottom surface of the sole cavity 605.

The view of the golf club head 600 provided in FIG. 6 provides another interesting feature of the present invention in creating the sole cavity 605 in a unique shape that sandwiches the sole insert (not shown) between the striking face 610 and the rear surface 612, both of which are substantially planar. The ability of the golf club head 600 to create this sandwich structure is important to maintaining the solid feel of a golf club head 600 that is built from one material, but still be capable of incorporating a significant amount of discretionary weight within the sole insert (not shown) to improve the performance of the golf club head 600.

Figure 7:
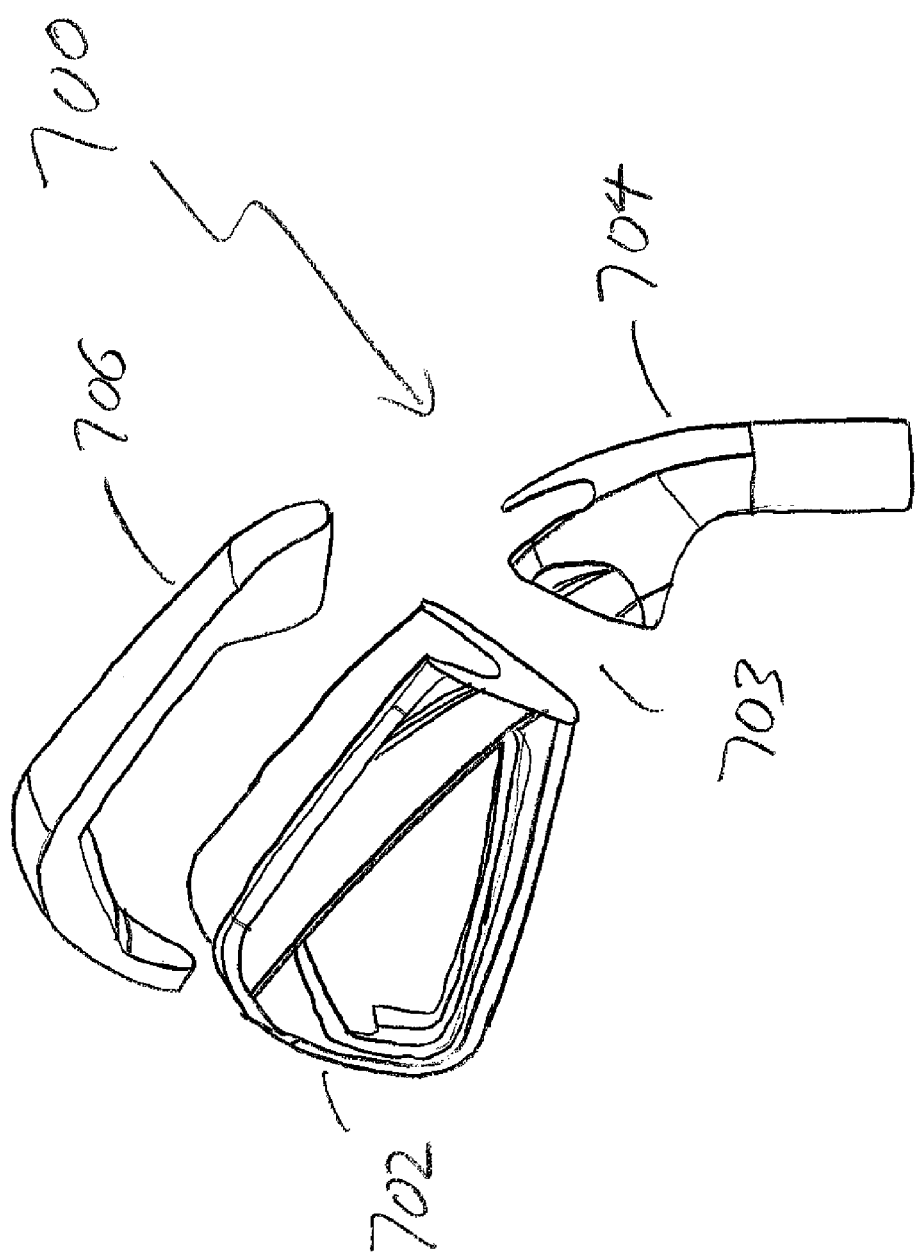
FIG. 7 shows an exploded perspective view of a golf club head in accordance with an exemplary embodiment of the present invention.

In summary, the present invention provides a golf club head that is made out of preferably three different materials to achieve the most discretionary weight without sacrificing the solid feel generally associated with a golf club head that is formed using a unitary material. In order to provide a comprehensive view of the three different materials, FIG. 7 is provided showing an exploded view of all three different of the components that have the different materials. More specifically, FIG. 7 shows an exploded perspective view of a golf club head 700 in accordance with an exemplary embodiment of the present invention. Here, it can be seen that the blade portion 702 may be separated from the hosel portion 704 at the bifurcation plane 703 to create two different components with different density characteristics. Because the blade portion 702 may be joined together with the hosel 704 using friction welding techniques such as spin welding, the materials are not easily separated, but are exploded from each other in this view for ease of identification. The exploded view of the golf club head 700 shown in FIG. 7 also allows the sole insert 706 to be shown in its natural state before being assembled into the golf club head 700. It is worthwhile to note here that the sole insert 706 in accordance with the current exemplary embodiment of the present invention may be where the majority of the weight of the golf club head 700 is focused, as the discretionary weight saved by the blade portion 702 opens up a significant amount of design space for the shape and geometry of the sole insert 706. Sole insert 706 in accordance with the current exemplary embodiment of the present invention may generally be welded to the blade portion 702 and hosel portion 704 of the golf club head 700; however numerous other attachment methods such as swaging, gluing, or even using screws may be used without departing from the scope and content of the present invention.

Figure 8:
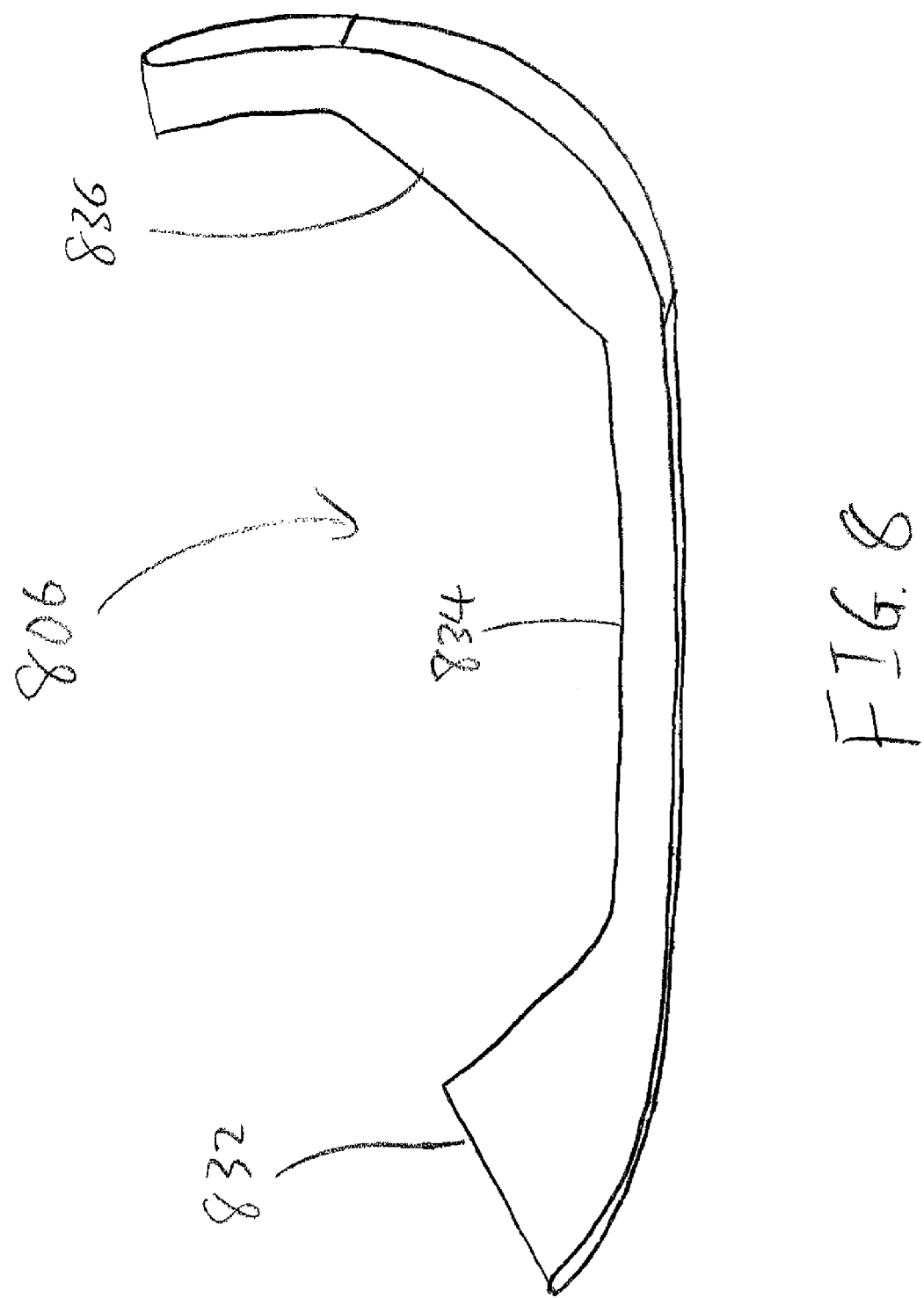
FIG. 8 shows a frontal view of a sole insert in accordance with an exemplary embodiment of the present invention.

FIG. 8 of the accompanying drawings shows an enlarged perspective view of the sole insert 806 in accordance with an exemplary embodiment of the present invention. This enlarged view of the sole insert 806 illustrates how the discretionary weight saved from the remainder of the golf club head could be used at strategic locations near the bottom of the golf club head to improve the performance of the golf club head. More specifically, FIG. 8 shows not only an increase in the size of the sole insert 806, but also the unique geometric shape of the sole insert 806 that indicates the strategic placement of the discretionary weight. Sole insert 806 may generally have a heel portion 832, a central portion 834, and a toe portion 836 of varying thicknesses to help not only create a lower CG, but also to increase the MOI of the golf club head. The increase in MOI of the golf club head can be achieved by increasing the thickness of the heel portion 832 and the toe portion 836 relative to the central portion 834, which in turn, makes the golf club head less susceptible to twisting when it is struck off center. It is also worth recognizing here that because significant amount of weight can be saved from the remainder of the golf club head, the toe portion 836 of the sole insert 806 is capable of extending higher into the toe of the body of the golf club head to provide extreme toe weighting to counteract the weight already designed into the hosel of the golf club head.

Figure 9:
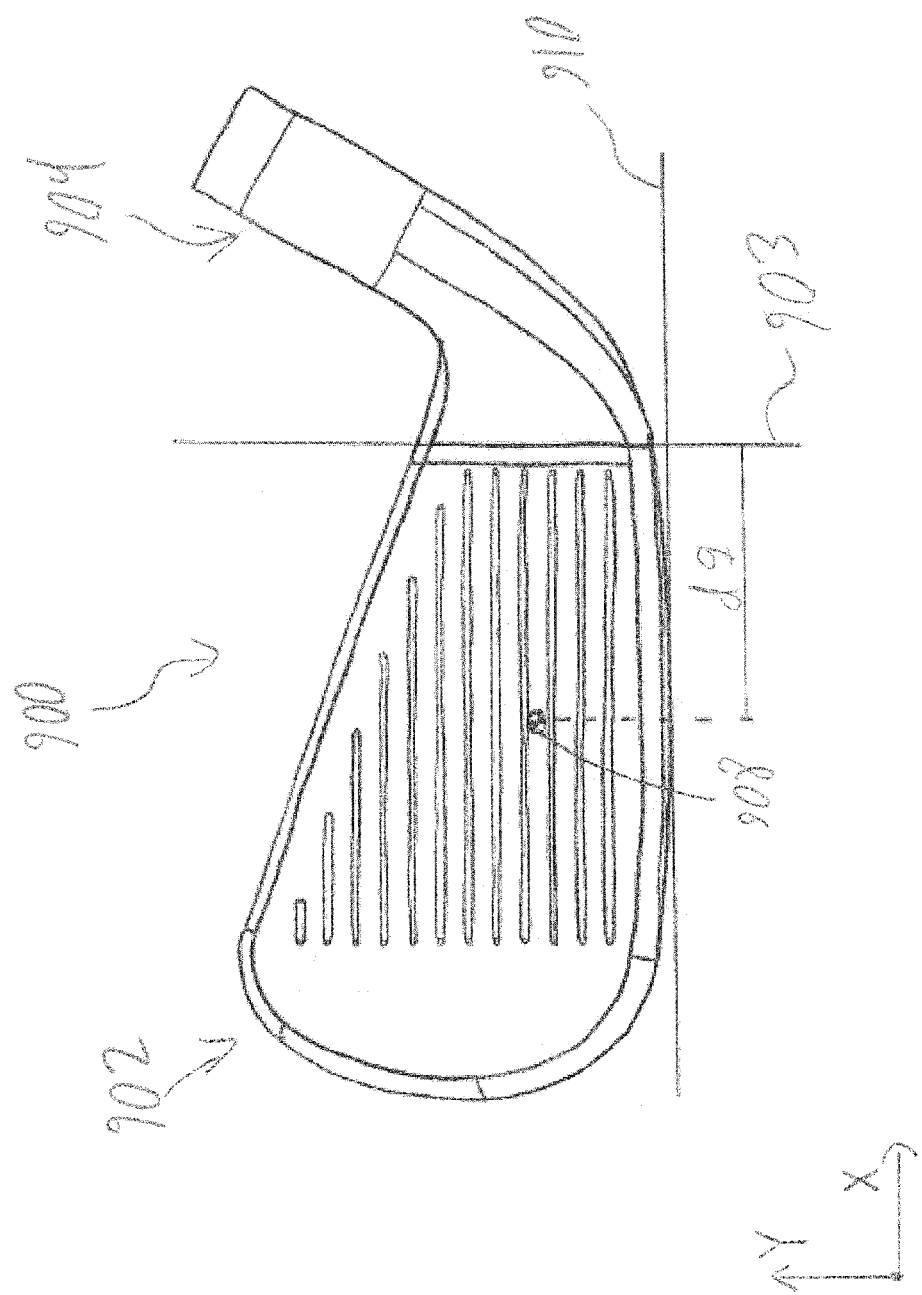
FIG. 9 shows a frontal view of a golf club head in accordance with an exemplary embodiment of the present invention

FIG. 9 of the accompanying drawings shows a front view of a golf club head 900 in accordance with an exemplary embodiment of the present invention. More specifically, FIG. 9 shows a golf club head 900 comprising a blade portion 902, and a hosel portion 904, separated by a bifurcation plane 903. Additionally, FIG. 9 illustrates face center 908 of the face of the golf club head 900. Face center 908, as referred to in the current application, is located on the striking face plane at a location that is at the midpoint along the length of the scorelines along the X-axis of the coordinate system and at a point that is 15 mm away from the ground 910 along the Y-axis of the coordinate system. The bifurcation plane 903, as defined in the current application, may generally refer to a plane that is perpendicular to the striking face plane and located at a distance d9 exactly 30 mm heel-ward from the face center 908 of the golf club head 900 along the X-axis.

It can be preferable to manufacture the blade portion 902 and the hosel portion 904 out of different materials, in order to maximize the performance characteristics of the golf club head 900, while also allowing the golf club head 900 to be modified to fit golfer's requirements. For example, the hosel portion 904 of the golf club head may need to be bent to alter lie angle or loft. Therefore, it is preferable for the hosel portion 904 of the club head 900 to yield without using extreme force and without cracking. It has been found that it is preferable for the hosel portion 904 to be comprised of a material having a yield strength less than about 570 MPa, to allow for adjustment of lie and loft angle without the use of excessive force. It is preferable however to construct the blade portion 902 out of a high strength material to achieve maximum performance characteristics. Thus, in accordance with an exemplary embodiment of the present invention, the blade portion 902 is made of a first material, and the hosel portion 904 is made of a second material. Additionally, it is preferable that the first material has a higher yield strength than the second material. In some embodiments, the first material has a yield strength greater than about 570 MPa and the second material has a yield strength less than about 570 MPa. In some embodiments, the first material has greater than 0.10% carbon content by weight and the second material has less than 0.10% carbon content by weight.

In some embodiments, over 50% of the blade portion 902 is made of a first material and over 50% of the hosel portion 904 is made of a second material. In other embodiments, over 70% of the blade portion 902 is made of a first material and over 70% of the hosel portion 904 is made of a second material. In additional embodiments, over 90% of the blade portion 902 is made of a first material and over 90% of the hosel portion 904 is made of a second material. In additional embodiments, over 95% of the blade portion 902 is made of a first material and over 95% of the hosel portion 904 is made of a second material.

Hardness is an additional indication of the strength of different materials, and thus of different portions of the golf club head 900. Hardness can be tested after a golf club head has been forged. To achieve an average hardness of each portion of the golf club head, greater than 3 tests are completed at random locations around each portion of the golf club head, and then averaged. In some embodiments, as a function of the different materials, the blade portion 902 can have an average Brinell HB hardness greater than about 275. The hosel portion 904 can have an average Brinell HB hardness less than about 275. In other embodiments, hosel portion 904 can have an average Brinell HB hardness less than about 250. In other embodiments, hosel portion 904 can have an average Brinell HB hardness less than about 225. In other embodiments, hosel portion 904 can have an average Brinell HB hardness less than about 200. In other embodiments, hosel portion 904 can have an average Brinell HB hardness less than about 175. In other embodiments, hosel portion 904 can have an average Brinell HB hardness less than about 150.

Figure 10:
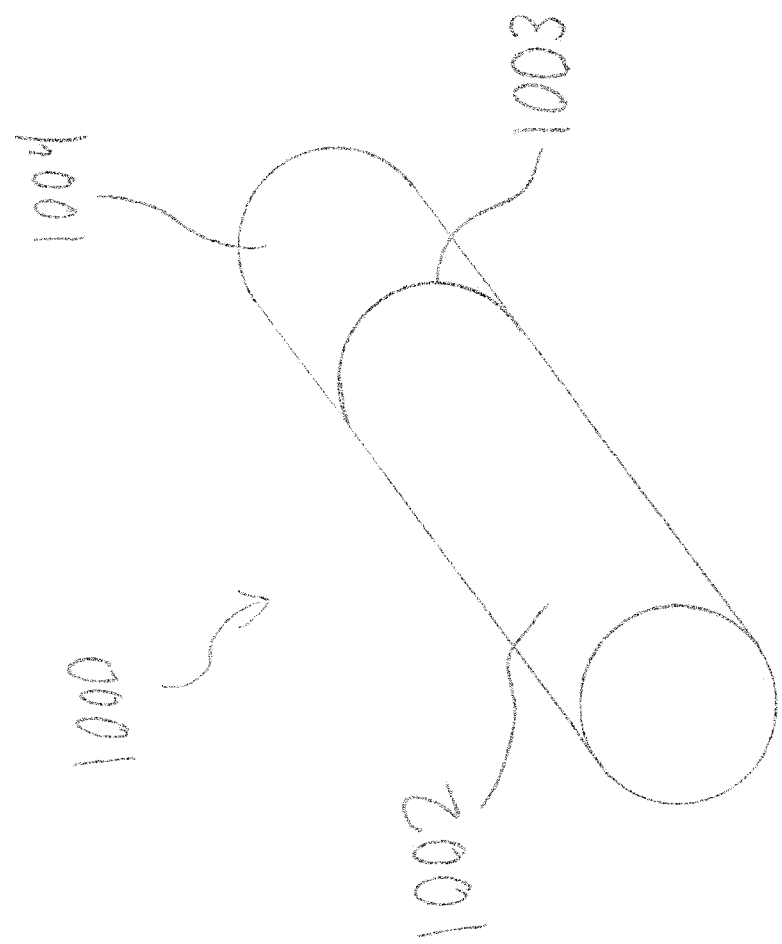
FIG. 10 shows a perspective view of a pre-form billet used to create a golf club head in accordance with an exemplary embodiment of the present invention.
Figure 11A:
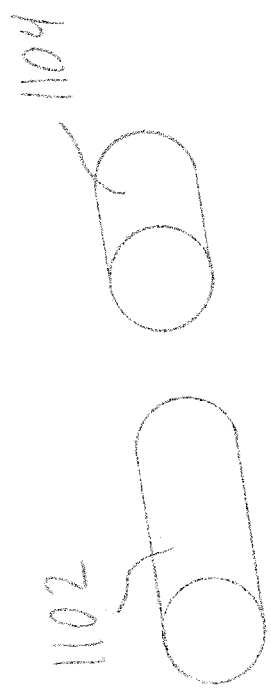
FIG. 11A shows a perspective view of a blade portion in the form of a rod and a hosel portion in the form of a rod in accordance with an exemplary embodiment of the present invention.
Figure 11B:
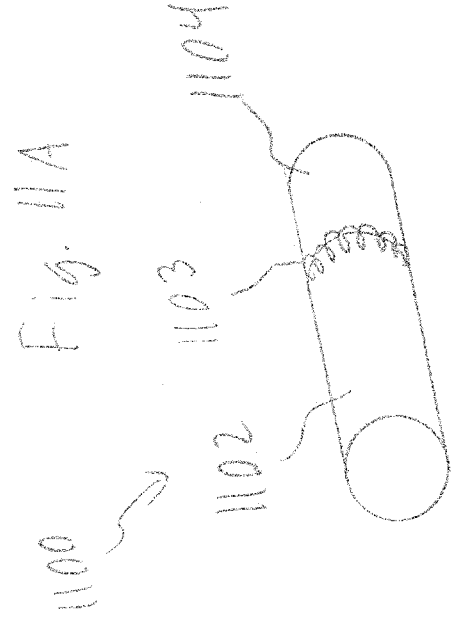
FIG. 11B shows a perspective view of a pre-form billet used to create a golf club head in accordance with an exemplary embodiment of the present invention.

A new and innovative method for forming such a golf club head 900 as illustrated in FIG. 9 has been developed. FIG. 10 illustrates a perspective view of a pre-form billet 1000 used to form the golf club head 900. Pre-form billet 1000 may generally have a blade portion 1002 and a hosel portion 1004 separated by a bifurcation plane 1003. The blade portion 1002 and hosel portion 1004 can be welded together. In some embodiments, as illustrated in FIGS. 11A and 11B, blade portion 1102 can be welded together around the perimeter of the bifurcation plane 1103. In other embodiments they can be spin welded together as described above. In an additional embodiment, as illustrated in FIGS. 12A and 12B, the blade portion 1202 and the hosel portion 1204 can each incorporate a locating feature 1212, 1214, configured to cooperate with one another and located said blade portion 1202 relative to said hosel portion 1204 during welding. The first locating feature 1212 can comprise a bore and the second locating feature 1214 can comprise a protrusion. These roles can be reversed in another embodiment. As illustrated in FIG. 12B, the second locating feature 1214 can be coupled to the first locating feature 1212, and the blade portion 1202 can be welded to the hosel portion 1204. Subsequently, the pre-form billet 1000, 1100, 1200 can be forged into a desired shape for the iron type golf club head 900. In another embodiment, the first locating feature 1212 and second locating feature 1214 could each include threads to further lock the blade portion 1202 to the hosel portion 1204. Additional mechanical locking features are possible as well.

The following is a list of example materials from which the first material could be selected: steel, managing steel, high strength steel, ultra high strength steel, stainless steel, low alloy steel, chrome moly steel, precipitation hardened stainless steel, 17-4, 15-3, 4340, 4140, 4130, Allvac® VascoMax® C300 Specialty Steel, Custom 455® Stainless, Custom 465® Stainless, Custom 475® Stainless, etc. (Allvac® is a registered trademark of Vanadium-Alloys Steel Company located in Latrobe Pa.; VascoMax® is a registered trademark of Allvac Metals Company located in Monroe, N.C.; Custom 455®, Custom 465®, and Custom 475® are registered trademarks of Carpenter Technology Corporation located in Reading, Pa.)

The following is a list of example materials from which the second material could be selected: steel, stainless steel, plain carbon steel, 304, 431, 1025, 1018, 1020, etc.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting form the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. An iron type golf club head comprising:
    a blade portion located near a terminal end of said iron type golf club head, said blade portion defining a striking face adapted for striking a golf ball and a rear surface, wherein over 50% of said blade portion is made out of a first material;
    a hosel portion located near a proximal end of said iron type golf club head, wherein over 50% of said hosel portion is made out of a second material; and
    a bifurcation plane defined as a plane that is perpendicular to said striking face positioned at a distance of 30 mm heel-ward along an X-axis from a face center of said iron type golf club head, said bifurcation plane separating said blade portion from said hosel portion;
    wherein said first material has a yield strength greater than about 570 MPa;
    wherein said second material has a yield strength less than about 570 MPa;
    wherein over 70% of said blade portion is made out of a first material and wherein over 70% of said hosel portion is made out of a second material;
    wherein said first material comprises greater than 0.10% carbon content by weight and wherein said second material comprises less than 0.10% carbon content by weight.

2. The iron type golf club head of claim 1, wherein over 90% of said blade portion is made out of a first material and wherein over 90% of said hosel portion is made out of a second material.

3. The iron type golf club head of claim 1, wherein said first material is 17-4 stainless steel and said second material is 304 stainless steel.

4. The iron type golf club head of claim 1, wherein said hosel portion has an average Brinell HB hardness less than about 250.

5. The iron type golf club head of claim 1, wherein said hosel portion has an average Brinell HB hardness less than about 225.

6. The iron type golf club head of claim 1, wherein said hosel portion has an average Brinell HB hardness less than about 200.

7. The iron type golf club head of claim 1, wherein said hosel portion has an average Brinell HB hardness less than about 175.

8. The iron type golf club head of claim 1, wherein said hosel portion has an average Brinell HB hardness less than about 150.

9. The iron type golf club head of claim 1, wherein said hosel portion has an average Brinell HB hardness less than about 125.

10. An iron type golf club head comprising:
    a blade portion located near a terminal end of said iron type golf club head, said blade portion defining a striking face adapted for striking a golf ball and a rear surface, wherein over 50% of said blade portion is made out of a first material;
    a hosel portion located near a proximal end of said iron type golf club head, wherein over 50% of said hosel portion is made out of a second material; and
    a bifurcation plane defined as a plane that is perpendicular to said striking face positioned at a distance of 30 mm heel-ward along an X-axis from a face center of said iron type golf club head, said bifurcation plane separating said blade portion from said hosel portion;
    wherein said first material has a yield strength greater than about 570 MPa;
    wherein said second material has a yield strength less than about 570 MPa;
    wherein over 70% of said blade portion is made out of a first material and wherein over 70% of said hosel portion is made out of a second material;
    wherein said first material is 17-4 stainless steel and said second material is 304 stainless steel.

11. A method of forming an iron type golf club head comprising:

providing a blade portion in the form of a rod, said blade portion made out of greater than 50% of a first material having a first yield strength;

providing a hosel portion in the form of a rod, said hosel portion out of greater than 50% of a second material having a second yield strength;

welding said blade portion together with said hosel portion into a pre-form billet;

forging said pre-form billet into a desired shape for said iron type golf club head;

wherein said first yield strength is greater than about 570 MPa;

wherein said second yield strength is less than about 570 MPa;

wherein the separation between said blade portion and said hosel portion is defined by a bifurcation plane, defined as a plane that is perpendicular to a striking face of said iron type golf club head, positioned at a distance of 30 mm heel-ward along an X-axis from a face center of said iron type golf club head.

12. The iron type golf club head of claim 11, wherein over 70% of said blade portion is made out of a first material and wherein over 70% of said hosel portion is made out of a second material.

13. The iron type golf club head of claim 11, wherein over 90% of said blade portion is made out of a first material and wherein over 90% of said hosel portion is made out of a second material.

14. The method of forming an iron type golf club head of claim 11, wherein said blade portion in the form of a rod further comprises a first locating feature and wherein said hosel portion in the form of a rod further comprises a second locating feature, wherein said first locating feature is configured to cooperate with said second locating feature to locate said blade portion relative to said second portion during welding.

15. The method of forming an iron type golf club head of claim 14, further comprising rotating said blade portion in the form of a rod relative to said hosel portion in the form of a rod, locking said blade portion to said hosel portion.

16. The method of forming an iron type golf club head of claim 14, further comprising welding around the perimeter of the intersection of said blade portion in the form of a rod and said hosel portion in the form of a rod.

* * * * *